United States Patent
Larson et al.

[19]

[11] Patent Number: 6,151,197
[45] Date of Patent: Nov. 21, 2000

[54] WATER SLIDE SUSPENSION ASSEMBLY HAVING A STIFFENED VERTICALLY OFFSET LIFT TAB

[75] Inventors: Nils E. Larson; Scott E. Watson; Keith R. Berding, all of San Jose, Calif.

[73] Assignee: Western Digital Corporation, Irvine, Calif.

[21] Appl. No.: 09/223,489

[22] Filed: Dec. 30, 1998

[51] Int. Cl.[7] .................................................. G11B 21/22
[52] U.S. Cl. ........................................ 360/255; 360/244.2
[58] Field of Search ................................ 360/104, 254.7, 360/254.8, 259.9, 255, 244.2, 245

[56] References Cited

U.S. PATENT DOCUMENTS

| | | | |
|---|---|---|---|
| 3,984,873 | 10/1976 | Pejcha ...................................... | 360/104 |
| 4,535,374 | 8/1985 | Anderson et al. ........................ | 360/104 |
| 4,853,811 | 8/1989 | Brooks, et al. ........................... | 360/104 |
| 5,027,241 | 6/1991 | Hatch et al. .............................. | 360/104 |
| 5,446,611 | 8/1995 | Webber .................................... | 360/104 |
| 5,455,723 | 10/1995 | Boutaghou et al. ....................... | 360/75 |
| 5,570,249 | 10/1996 | Aoyagi et al. ............................. | 360/104 |
| 5,623,758 | 4/1997 | Brooks, et al. ....................... | 29/603.01 |
| 5,625,514 | 4/1997 | Kubo et al. ............................... | 360/104 |
| 5,862,018 | 1/1999 | Vera et al. ................................ | 360/105 |
| 5,875,072 | 2/1999 | Brooks, Jr. et al. ..................... | 360/104 |
| 5,930,078 | 7/1999 | Albrecht et al. .......................... | 360/104 |
| 5,973,887 | 10/1999 | Cameron ................................. | 360/105 |
| 5,995,330 | 11/1999 | Furay et al. .............................. | 360/105 |

OTHER PUBLICATIONS

Five copies of photographs of a suspension assembly having a lift tab of a "Travelstar"—series IBM 2.5 inch form factor hard disk drive, model number "DYLA–Z8100", as publicly announced in an IBM press release dated Oct. 15, 1997.

*Primary Examiner*—Brian E. Miller
*Attorney, Agent, or Firm*—Milad G. Shara

[57] ABSTRACT

The disk includes a disk recording surface, and the ramp includes a ramp. A head stack assembly of a hard disk drive includes an actuator arm and a suspension assembly attached to the actuator arm. The suspension assembly includes a first elongated region having a distal region and a planar surface for facing toward the disk recording surface; the first elongated region defines a longitudinal axis. The suspension assembly includes a second elongated region positioned adjacent to the distal region. The second elongated region includes a lift tab for engaging the ramp surface and is vertically offset from the planar surface such that the lift tab is vertically displaced further from the disk recording surface than the planar surface. The second elongated region further includes a curved lift tab supporting member for supporting the lift tab and positioned between the distal region and the lift tab. The lift tab supporting member includes a first region integrally formed with the distal region, a second region integrally formed with the lift tab, and a third region positioned between the first and second regions such that the second region is vertically offset from the first region. The third region defines a first trough for stiffening the supporting member. The distal region and the first region define a second trough for stiffening the distal and first regions. The second trough extends along the direction of the longitudinal axis and has an outer surface for facing toward the disk recording surface, the outer surface being vertically displaced closer toward the disk recording surface than the planar surface.

30 Claims, 7 Drawing Sheets

Fig. 6

WATER SLIDE SUSPENSION ASSEMBLY HAVING A STIFFENED VERTICALLY OFFSET LIFT TAB

BACKGROUND OF THE INVENTION

1. Field of the Invention

This invention relates to hard disk drives. More particularly, this invention relates to a suspension assembly having a stiffened vertically offset lift tab used in a rampload disk drive.

2. Description of the Prior Art and Related Information

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 2 gigabytes per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a base and a cover, at least one disk having at least one disk recording surface, a spindle motor for causing each disk to rotate, and an actuator arrangement. The printed circuit board assembly includes circuitry for processing signals and controlling operations.

Actuator arrangements can be characterized as either linear or rotary; substantially every contemporary cost-competitive small form factor drive employs a rotary actuator arrangement.

The rotary actuator arrangement is a collection of elements of the head disk assembly; the collection typically includes certain prefabricated subassemblies and certain components that are incorporated into the head disk assembly. The prefabricated assemblies include a pivot bearing cartridge and, in some cases, a prefabricated head stack assembly. Other components of the rotary actuator arrangement are permanent magnets and an arrangement for supporting the magnets to produce a magnetic field for a voice coil motor. The prefabricated head stack assembly includes a coil forming another part of the voice coil motor. The prefabricated head stack assembly also includes an actuator body having a bore through it, and a plurality of arms projecting parallel to each other and perpendicular to the axis of the bore. The prefabricated head stack assembly also includes head gimbal assemblies that are supported by the arms. Each head gimbal assembly includes a suspension assembly and a head supported by the suspension assembly.

Hard disk drives which are targeted for the desktop and server markets typically use a technique known as "Contact Start/Stop" ("CSS") to transition a "flying head" off-of and back-onto a surface of a magnetic disk. Typically, an annular region on the disk known as a "landing zone" is used to transition the head off-of and back-onto the surface of the disk. During a disk spin-down period, the head is moved to the landing zone and as the disk rotation speed decreases, the head comes into contact with the landing zone and slides on the surface until the disk comes to a rest. In such a condition, the head is "parked" in the landing zone. The landing zone is generally textured to reduce stiction ("static friction") between the head and the disk. During a disk spin-up period, once stiction is overcome, the head slides on the surface until the disk reaches sufficient rotational speed to generate an air bearing between the head and disk such that the head is "flying" above the disk. The sliding occurring during disk spin-up and spin-down periods causes disk wear which requires careful control of the interface materials (i.e., the materials forming an interface between the head and disk) and surface topographies ("textures") to ensure minimal wear over the expected life of the hard disk drive.

An alternative method of transitioning a flying head off-of and back-onto the disk is known as "rampload." This method uses a ramp which interacts with a feature ("lift tab") on a suspension that supports the head. The disk is spun-up while the suspension is supported by the ramp and the head is not in contact with the disk. Once the disk is rotating at a sufficiently high speed for generating an air bearing, the suspension and head are moved down and off the ramp until the head generates an air bearing with the disk. The suspension and head then move free of the ramp. Before the disk is spun-down, the suspension is moved onto the ramp and the head is moved away from the disk. The rampload method eliminates the wear issues associated with the CSS method.

Figure 1A:
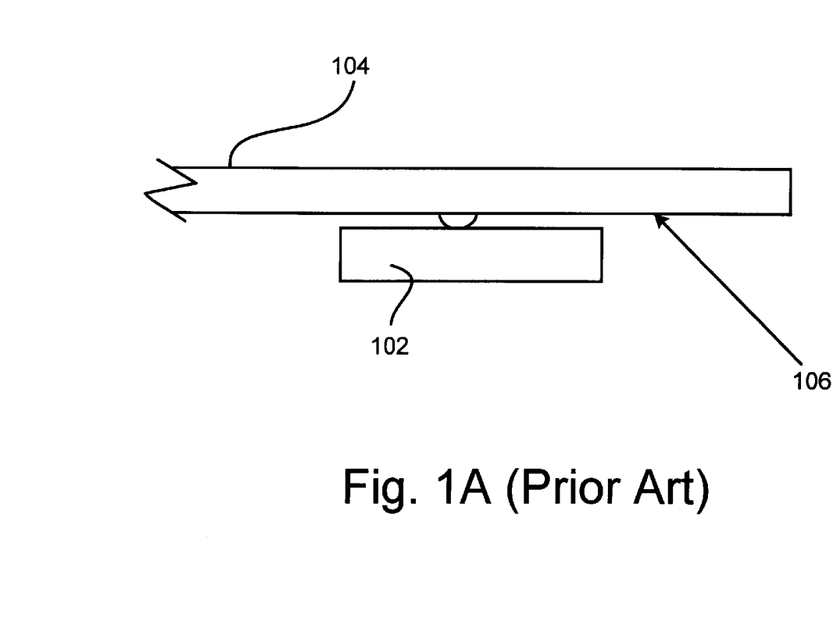
FIGS. 1A–1B show a prior art rampload method.
Figure 1B:
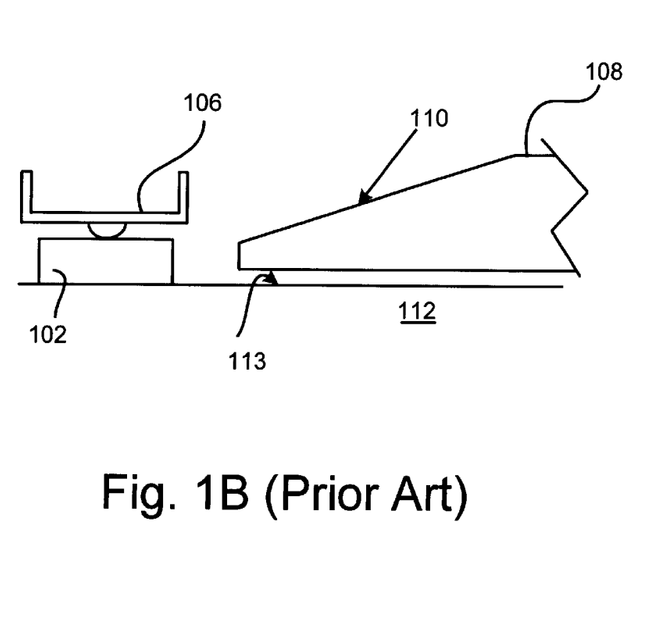

With reference to FIGS. 1A and 1B, a prior art rampload method is shown. A portion of a head gimbal assembly is shown in FIG. 1A in which the portion includes a suspension 104, a lift tab 106 extending from the suspension, and a head 102. As shown in FIG. 1B, lift tab 106 engages with a ramp surface 110 of a ramp member 108. Ramp member 108 is part of an overall ramp which is typically coupled to a base of a disk drive. As shown in FIG. 1B, ramp member 108 is sufficiently spaced-apart vertically from a disk recording surface 113 of disk 112 and head 102 has been moved off the ramp and loaded onto disk 112. While the lift tab shown in FIGS. 1A and 1B is suitable for its intended purpose when using relatively large heads such as "Nano" sized heads (0.017 inch thick), such a lift tab poses design challenges when smaller heads are used, such as "Pico" (0.012 inch thick) and "Femto" (0.008 inch thick) sized heads. When such smaller heads are used in combination with the lift tab shown in FIGS. 1A and 1B, the distance between the lift tab and the disk recording surface decreases such that the vertical spacing between ramp member 108 and disk recording surface 113 decreases correspondingly. In such a condition, the ramp member 108 is lowered too close to disk recording surface 113 resulting in extremely tight tolerance requirements for the vertical spacing.

SUMMARY OF THE INVENTION

This invention can be regarded as a suspension assembly for a disk drive having a disk recording surface and a ramp surface. The suspension assembly includes a first elongated region having a distal region and a planar surface for facing toward the disk recording surface; the first elongated region defines a longitudinal axis. The suspension assembly includes a second elongated region positioned adjacent to the distal region. The second elongated region includes a lift tab for engaging the ramp surface and is vertically offset from the planar surface such that the lift tab is vertically displaced further from the disk recording surface than the planar surface.

The second elongated region further includes a curved lift tab supporting member for supporting the lift tab and positioned between the distal region and the lift tab. The lift tab supporting member includes a first region being integrally formed with the distal region, a second region being integrally formed with the lift tab, and a third region positioned between the first and second regions such that the second region is vertically offset from the first region. The third region defines a first trough for stiffening the supporting member. The distal region and the first region define a second trough for stiffening the distal and first regions. The second trough extends along the longitudinal axis and includes an outer surface for facing toward the disk recording surface. Significantly, the outer surface is vertically displaced closer toward the disk recording surface than the planar surface.

This invention can also be regarded as a head stack assembly for a disk drive having a disk recording surface and a ramp surface. The head stack assembly includes an actuator arm and a suspension assembly attached to the actuator arm. The suspension assembly includes a first elongated region having a distal region and a planar surface for facing toward the disk recording surface; the first elongated region defines a longitudinal axis. The suspension assembly includes a second elongated region positioned adjacent to the distal region. The second elongated region includes a lift tab for engaging the ramp surface and is vertically offset from the planar surface such that the lift tab is vertically displaced further from the disk recording surface than the planar surface.

The second elongated region further includes a curved lift tab supporting member for supporting the lift tab and positioned between the distal region and the lift tab. The lift tab supporting member includes a first region being integrally formed with the distal region, a second region being integrally formed with the lift tab, and a third region positioned between the first and second regions such that the second region is vertically offset from the first region. The third region defines a first trough for stiffening the supporting member. The distal region and the first region define a second trough for stiffening the distal and first regions. The second trough extends along the longitudinal axis and includes an outer surface for facing toward the disk recording surface. Significantly, the outer surface is vertically displaced closer toward the disk recording surface than the planar surface.

This invention can also be regarded as a disk drive which includes a base, a spindle motor attached to the base, a disk mounted on the spindle motor, a ramp attached to the base, and a head stack assembly coupled to the base. The disk includes a disk recording surface, and the ramp includes a ramp surface. The head stack assembly includes an actuator arm and a suspension assembly attached to the actuator arm. The suspension assembly includes a first elongated region having a distal region and a planar surface for facing toward the disk recording surface; the first elongated region defines a longitudinal axis. The suspension assembly includes a second elongated region positioned adjacent to the distal region. The second elongated region includes a lift tab for engaging the ramp surface and is vertically offset from the planar surface such that the lift tab is vertically displaced further from the disk recording surface than the planar surface.

The second elongated region further includes a curved lift tab supporting member for supporting the lift tab and positioned between the distal region and the lift tab. The lift tab supporting member includes a first region being integrally formed with the distal region, a second region being integrally formed with the lift tab, and a third region positioned between the first and second regions such that the second region is vertically offset from the first region. The third region defines a first trough for stiffening the supporting member. The distal region and the first region define a second trough for stiffening the distal and first regions. The second trough extends along the longitudinal axis and includes an outer surface for facing toward the disk recording surface. Significantly, the outer surface is vertically displaced closer toward the disk recording surface than the planar surface.

DETAILED DESCRIPTION OF PREFERRED EMBODIMENTS

Figure 2:
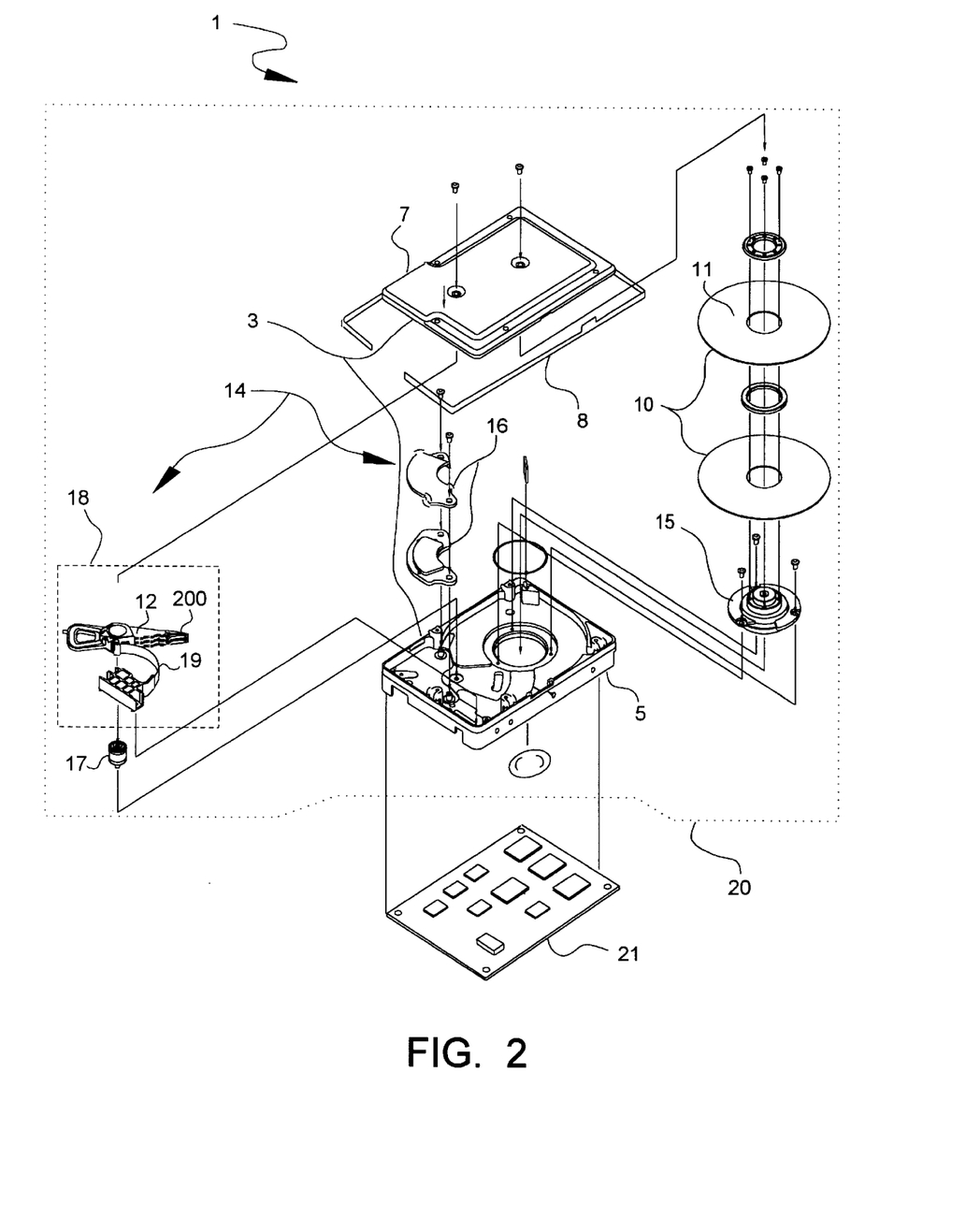
FIG. 2 is an exploded view of a hard disk drive incorporating this invention.

With reference to FIG. 2, a disk drive 1 embodying this invention comprises an enclosure 3 comprising a base 5 and a cover 7. Enclosure 3 is sealed to provide a relatively contaminant-free interior for a head disk assembly (HDA) portion 20 of disk drive 1. Suitably, a tape seal 8 or a gasket seal (not shown) is used to seal enclosure 3. Disk drive 1 also includes a printed circuit board assembly 21 which contains the circuitry for processing signals and controlling operations of disk drive 1.

Figure 4:
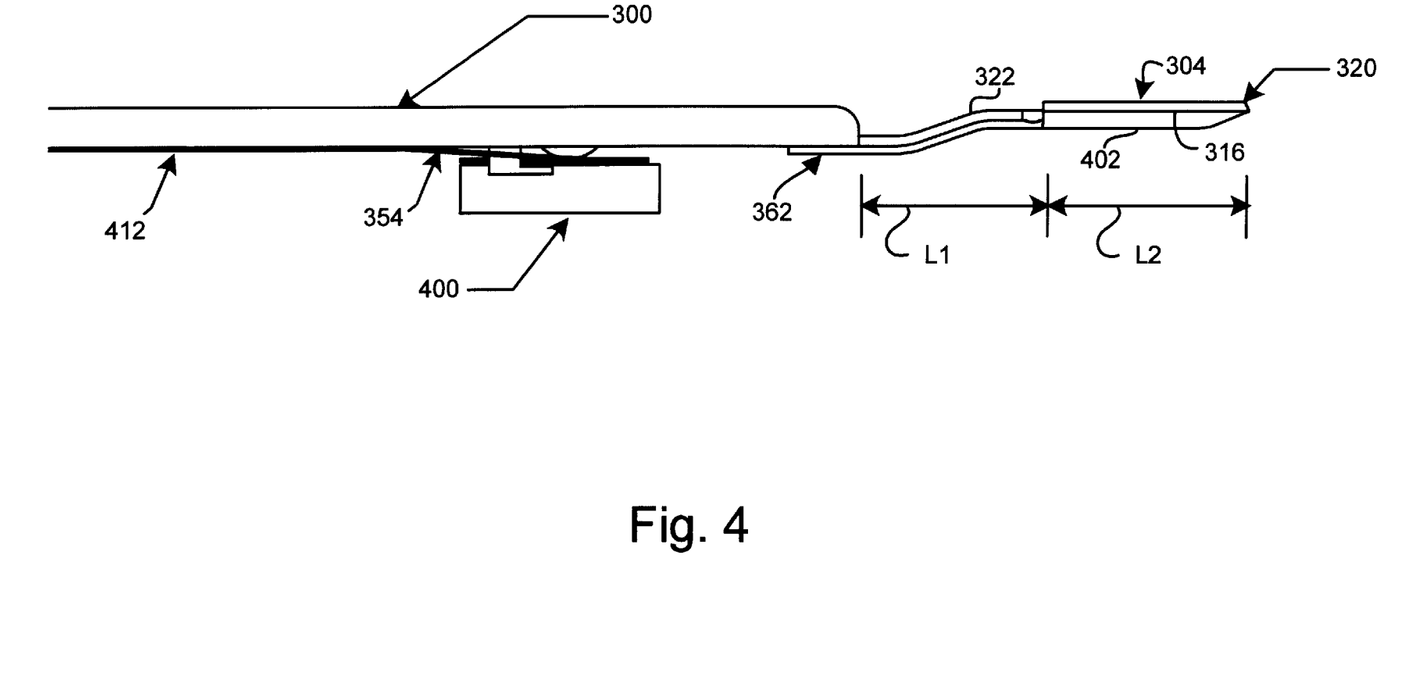
FIG. 4 is a side view of FIG. 3B in which a magnetic head is positioned on the suspension assembly.

Within its interior, disk drive 1 includes a magnetic disk 10 having a disk recording surface 11, and includes a magnetic head 400 (see FIG. 4). The particular embodiment shown in FIG. 1 includes two disks 10, providing four recording surfaces, and includes four magnetic heads. Disk drive 1 further includes a rotary actuator arrangement generally indicated at 14 and a ramp 22 (see FIG. 5) attached to the base. A spindle motor 15 causes each disk 10 to spin, preferably at a constant angular velocity.

Rotary actuator arrangement 14 provides for positioning the magnetic head over a selected area of disk recording surface 11 of disk 10. Rotary actuator arrangement 14 includes a permanent-magnet arrangement generally indicated at 16, a pivot bearing cartridge 17 and a head stack assembly 18. Pivot bearing cartridge 17 includes a stationary shaft secured to enclosure 3 to define an axis of rotation for rotary actuator arrangement 14. Head stack assembly 18 includes a flexible circuit assembly 19, an actuator arm 12 and a head gimbal assembly having a suspension assembly 200 attached to actuator arm 12. In the embodiment depicted in FIG. 2, a plurality of actuator arms with a corresponding number of head gimbal assemblies are shown.

Figure 3A:
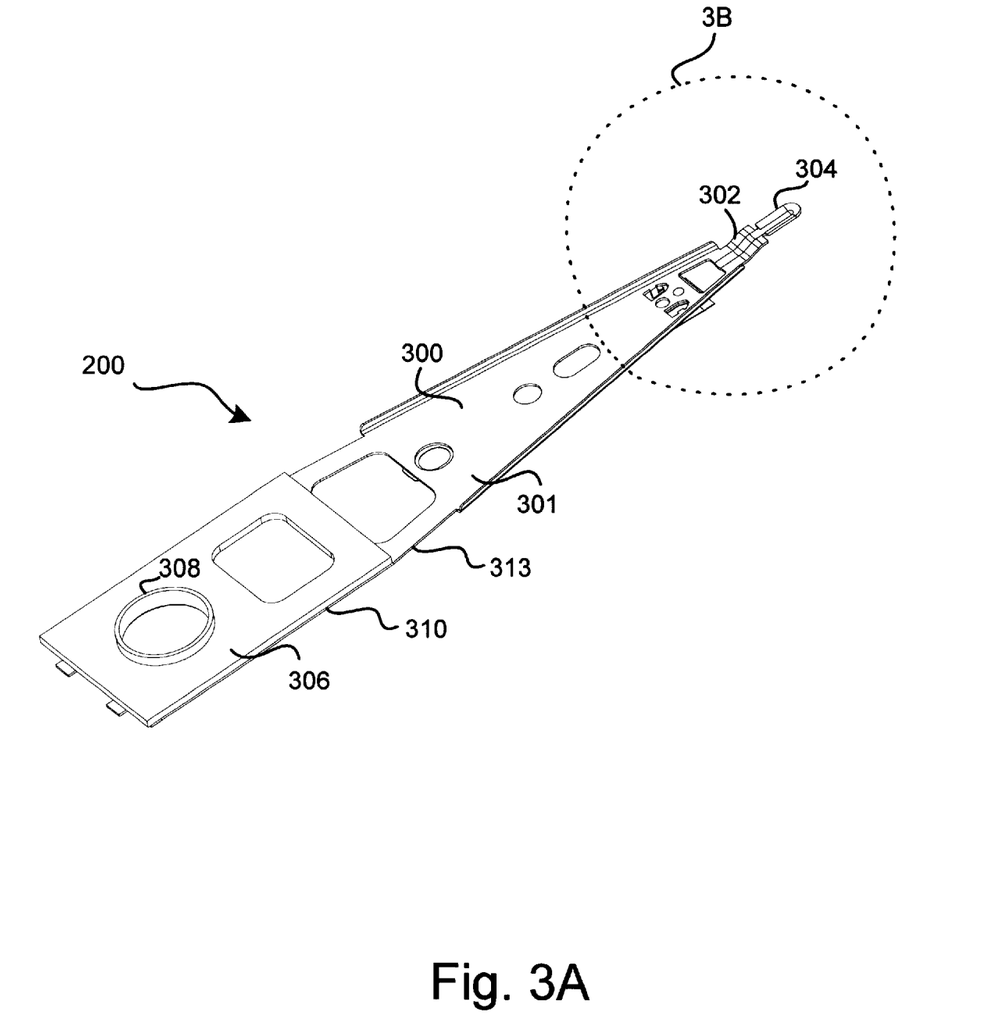
FIG. 3A is a perspective view of a suspension assembly according to an embodiment of this invention.
Figure 3B:
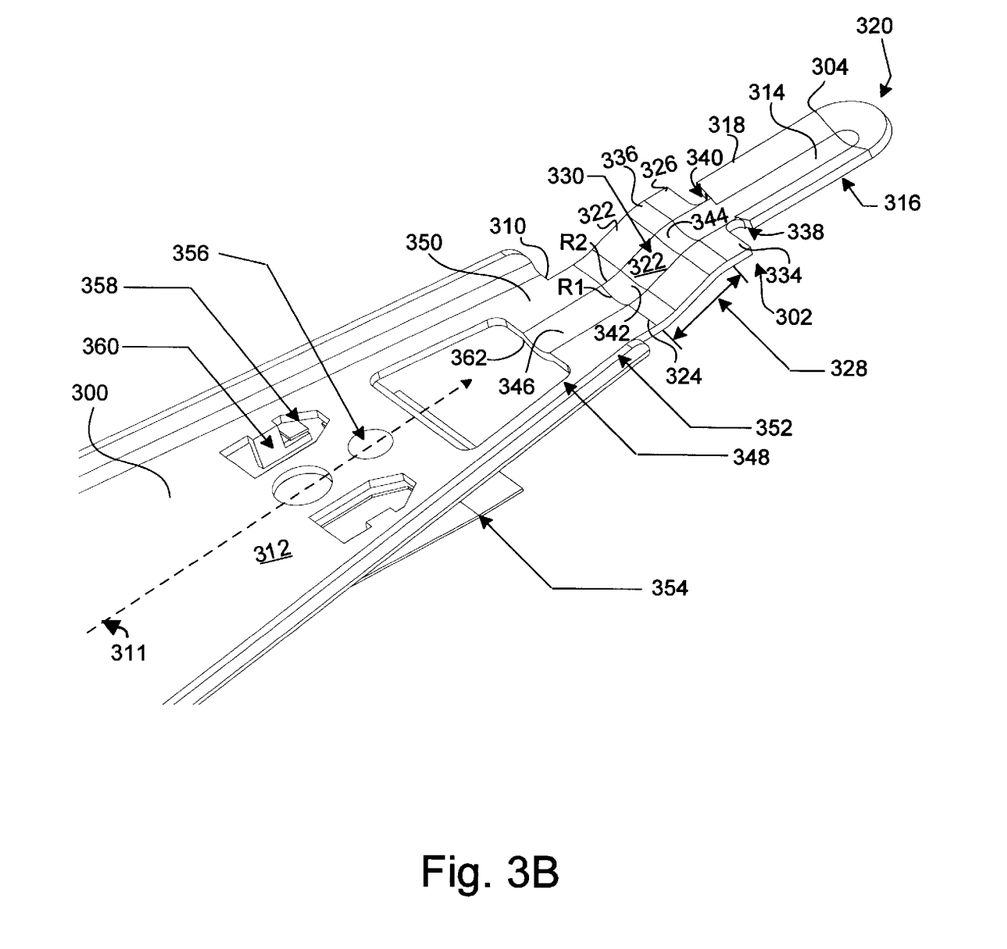
FIG. 3B is an enlarged perspective view of a portion of FIG. 3A.

With reference to FIGS. 3A–3B, suspension assembly 200 includes a suspension 301 ("load beam"), a mount plate 306 attached to the suspension, a second elongated region 302 having a lift tab 304, and a flexure 354. Magnetic head 400 is mounted on the flexure (see FIG. 4). Suspension 301 includes a first elongated region 300, a hinge region 313, and a mounting region 310. As shown in FIG. 3A, mount plate 306 is attached to mount region 310 and mount plate 306 includes a swage boss 308. Swage boss 308 is used to attach suspension assembly 200 to actuator arm 12 by a process known as "swaging."

Continuing with FIG. 3B, first elongated region 300 includes a distal region 350 defining a distal end 310, a planar surface 312 for facing away from a disk recording surface, and a planar surface 412 for facing toward the disk recording surface (see FIGS. 4 and 6); first elongated region 300 defines a longitudinal axis 311. Second elongated region 302 is positioned adjacent to distal region 350. Preferably, second elongated region 302 is integrally formed with first elongated region 300 by a suitable process such as stamping. Suitably, the suspension assembly may be made from a metallic material such as stainless steel. Second elongated region 302 includes lift tab 304 for engaging a ramp surface 26 (see FIG. 5) and a curved lift tab supporting member 322 for supporting the lift tab. Lift tab 304 is vertically offset from planar surface 312 such that the lift tab is vertically displaced further from disk recording surface 11 (see FIG. 5) than planar surface 412. In other words, a bottom surface 402 (see FIG. 4) of lift tab 304 is vertically displaced further from disk recording surface 11 than planar surface 412 such that the bottom surface is spaced-apart vertically from planar surface 412. Preferably, the vertical offset is in a range from about 0.04 mm to about 0.24 mm and even more preferably, 0.1265 mm. Lift tab 304 includes a cylindrically shaped trough 314 for stiffening the lift tab, a first lift tab flange 316, a second lift tab flange 318, and a spherical tip 320; lift tab flanges 316 and 318 stiffen lift tab 304.

Continuing with FIG. 3B, supporting member 322 is positioned between distal region 350 and lift tab 304 and includes a first region 324 being integrally formed with distal region 350, a second region 326 being integrally formed with lift tab 304, and a third region 328 positioned between the first and second regions such that second region 326 is vertically offset from first region 324. During a metal forming process, first and second regions 324 and 326 are "clamped" such that the bend through third region 328 can be made. Supporting member 322 further includes a first supporting member flange 334 and a second supporting member flange 336, each flange stiffening the supporting member. A notch 338 is defined by first lift tab flange 316 and first supporting member flange 334 and another notch 340 is defined by second lift tab flange 318 and second supporting member flange 336. Each notch separates a given pair of flanges longitudinally such that lift tab flanges 316 and 318 may be bent upwards relative to the supporting member flanges. Third region 328 defines a first trough 330 for stiffening supporting member 322 in which first trough 330 includes a first surface 332 defining a semi-cylindrically shaped surface in which its axis is inclined relative to planar surfaces 412 and 312, a second surface 342 adjacent to first surface 332, and a third surface 344. Second surface 342 is positioned between distal region 350 and first surface 332 and defines a first radius of curvature R1 and a second radius of curvature R2 different than the first radius of curvature. The centers of each radii are on the same side of second surface 342 such that second surface 342 is generally in the shape of an "elliptic paraboloid." Third surface 344 is positioned between first surface 332 and lift tab 304 and has a saddle shape; third surface 344 includes two different curvature radii, the centers of each radii being on opposite sides of the third surface such that the third surface is generally in the shape of a "hyperbolic paraboloid."

Continuing with FIG. 3B, first elongated region 300 further includes an aperture 348 positioned adjacent to distal region 350. Distal region 350 and first region 324 define a semicylindrically shaped second trough 346 for stiffening the distal and first regions. Second trough 346 extends along longitudinal axis 311 and is contiguous to first trough 330 and preferably extends to aperture 348. Second trough 346 includes an outer surface 362 for facing toward disk recording surface 11. Significantly, outer surface 362 is vertically displaced closer toward disk recording surface 11 than planar surface 412. Flexure 354 includes tabs 358 which are integrally formed with the flexure. Limiter fingers 360 extend from first elongated region 300 and interact with tabs 358 for lifting magnetic head 400 away from a disk. First elongated region 300 further includes rails 352 for stiffening the first elongated region and a dimple 356 for allowing the magnetic head to gimbal over the dimple to conform over a disk recording surface when the magnetic head is flying.

As shown in FIG. 3B, a portion of second trough 346, the entire first trough 330, and trough 314 define a "continuous trough" having in part a "waterslide" configuration along the center of supporting member 322. The continuous trough begins at spherical tip 320 and terminates at aperture 348. Significantly, aperture 348 isolates the dimple region from the regions used to form the continuous trough to prevent distortion of the dimple region during the continuous trough forming process. Preferably, a magnetic head having a "negative pressure" air bearing ("negative pressure air bearing head") is used in combination with limiter fingers 360 and tabs 358. The geometry of such heads produces negative as well as positive pressures and the balanced forces of these pressures yield less fly height variation due to gram load, skew angle, altitude, shock, and other factors. Such heads are distinguished from heads that generate only positive pressures ("positive pressure air bearing head"). In an alternative embodiment, limiter fingers 360 and tabs 358 would be eliminated if positive pressure air bearing heads were used.

Figure 5:
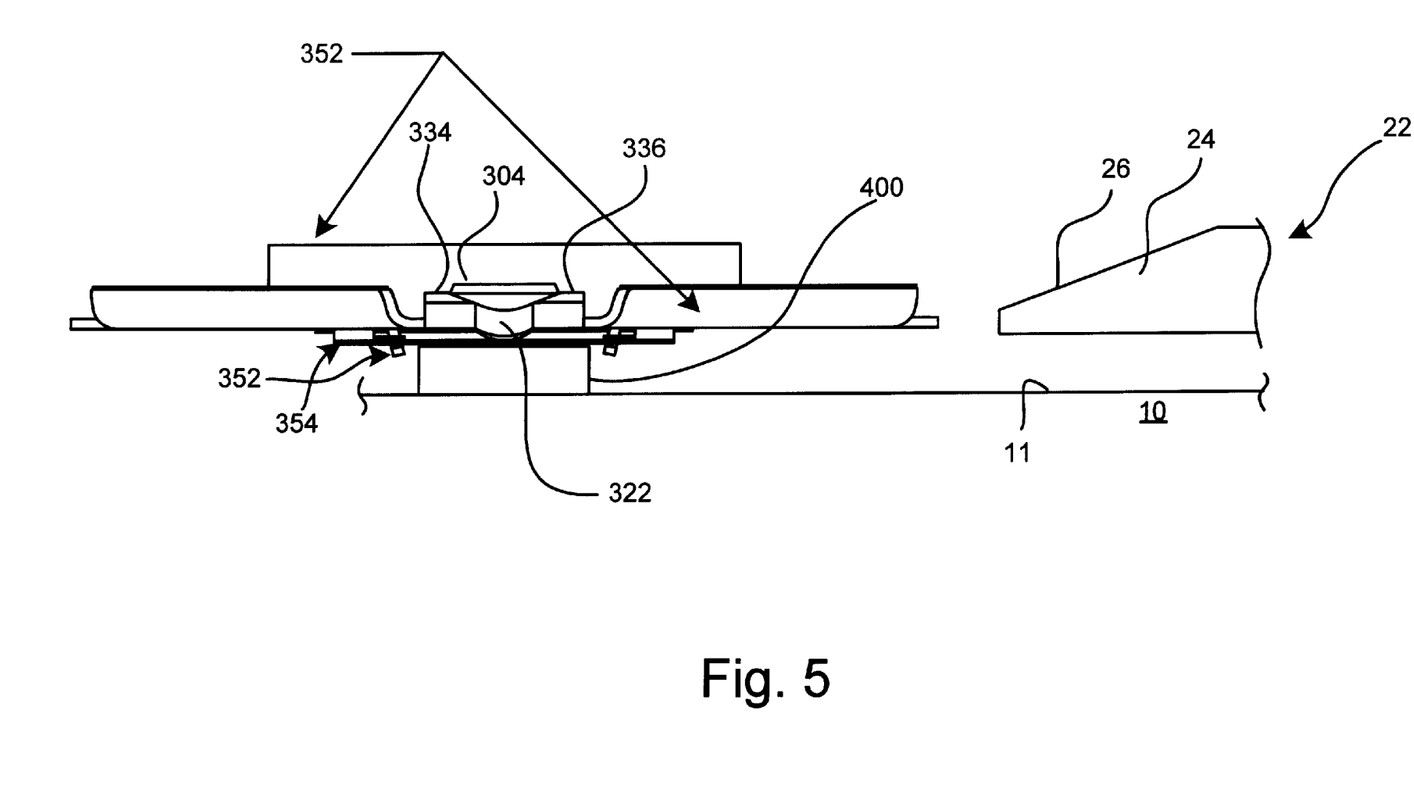
FIG. 5 is a front view of FIG. 3B in combination with a magnetic head, a ramp member and a disk.
Figure 6:
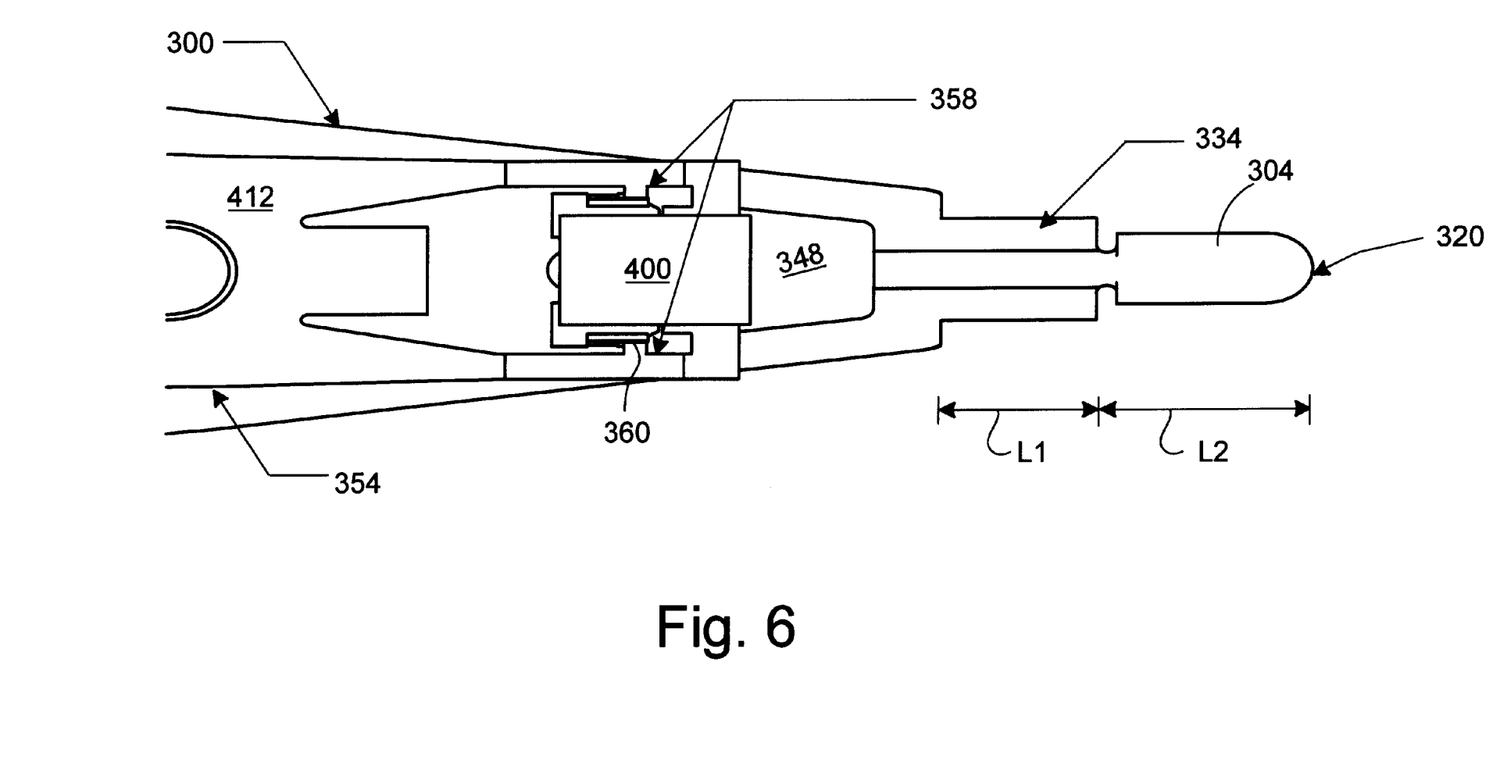
FIG. 6 is a bottom plan view of FIG. 4.

With reference to FIGS. 4–6, first elongated regions 300 is shown in which magnetic head 400 is attached to flexure 354. Flexure 354 is suitably attached via a welding process to bottom surface 412 of first elongated region 300. Supporting member 322 is elongated along the direction of longitudinal axis 311 (see FIG. 3B) and has a length L1 which extends from distal end 310 (see FIG. 3B) to the proximal end of lift tab flange 316. Lift tab 304 has a length L2 which extends from the proximal end of lift tab flange 316 to the distal end of spherical tip 320. As shown in FIGS. 4 and 6, the length of lift tab 304 is substantially the same as the length of supporting member 322. As used herein, the term "substantially" is defined such that length L1 is within +/−50 percent of length L2. Lift tab further includes bottom surface 402 for contacting a ramp surface of a ramp member during head load and unload operations.

With reference to FIG. 5, a front view of suspension assembly 200 is shown in which magnetic head 400 has been moved off ramp surface 26 and "loaded" onto disk 10 such that the head is flying above disk recording surface 11. Significantly, the provision of a vertically offset lift tab 304 via a stiffened supporting member 322 allows ramp member 24 to be sufficiently spaced-apart vertically from disk recording surface 11 while simultaneously allowing smaller heads such as "Pico" and "Femto" heads to be used on the suspension assembly. As previously noted, ramp member 24 is part of an overall ramp 22 which typically includes a plurality of ramp members 24, each ramp member corresponding to a respective disk recording surface. First and second supporting member flanges 334 and 336 extend radially out further than lift tab 304 such that the width of supporting member 322 is greater than the width of lift tab 304. Limiter fingers 360 interact with tabs 358 (see FIGS. 3B and 6) on flexure 354 to provide a sufficient vertical force to lift negative pressure air bearing head 400 off the disk recording surface during a head unload operation. When head 400 is flying above disk recording surface 11, limiter fingers 360 do not contact tabs 358 and flexure 354 exhibits low pitch and roll stiffness, allowing head 400 to gimbal over dimple 356 (see FIG. 3B) and conform to the disk recording surface. When the suspension assembly is lifted via the lift tab, magnetic head 400 will remain on disk recording surface 11, flexure 354 will separate from dimple 356 and as the dimple separation increases, limiter fingers 360 will engage tabs 358 on the flexure. Once in contact with limiter fingers 360, flexure 354 will exhibit a much higher vertical stiffness and will generate a sufficient vertical force to lift head 400 from disk recording surface 11 in a relatively short vertical lift. The short vertical lift is a constraint imposed by small disk to disk spacing dictated by a disk stack having multiple disks.

We claim:

1. A suspension assembly for a disk drive having a disk recording surface and a ramp surface, the suspension assembly comprising:
 a first elongated region having a distal region and a planar surface for facing toward the disk recording surface, the first elongated region defining a longitudinal axis;
 a second elongated region positioned adjacent to the distal region;
 the second elongated region including:
  a lift tab for engaging the ramp surface, the lift tab being vertically offset from the planar surface such that the lift tab is vertically displaced further from the disk recording surface than the planar surface;
  a curved lift tab supporting member for supporting the lift tab, the lift tab supporting member positioned between the distal region and the lift tab;
  the lift tab supporting member including:
   a first region being integrally formed with the distal region;
   a second region being integrally formed with the lift tab;
   a third region positioned between the first and second regions such that the
   second region is vertically offset from the first region,
   the third region defining a first trough for stiffening the supporting member; and
  the distal region and the first region defining a second trough for stiffening the distal and first regions, the second trough extending along the direction of the longitudinal axis, the second trough having an outer surface for facing toward the disk recording surface, the outer surface being vertically displaced closer toward the disk recording surface than the planar surface.

2. The suspension assembly of claim 1 wherein the first elongated region further includes:
 an aperture positioned adjacent to the distal region; and
 the second trough being contiguous to the first trough and extending to the aperture.

3. The suspension assembly of claim 2 wherein the second trough is semi-cylindrically shaped.

4. The suspension assembly of claim 1 wherein the first elongated region is integrally formed with the second elongated region.

5. The suspension assembly of claim 1 wherein the first trough includes:
 a first surface defining a semi-cylindrically shaped surface; and
 a second surface adjacent to the first surface, the second surface defining a first radius of curvature and a second radius of curvature different than the first radius of curvature, the second surface positioned between the distal region and the first surface.

6. The suspension assembly of claim 5 wherein the first trough further includes a third surface positioned between the first surface and the lift tab, the third surface being in the shape of a saddle.

7. The suspension assembly of claim 5 wherein an axis of the first surface is inclined relative to the planar surface.

8. The suspension assembly of claim 1 further comprising:
 a first lift tab flange;
 a first supporting member flange;
 the first lift tab flange and the first supporting member flange defining a notch such that the flanges are spaced-apart longitudinally.

9. The suspension assembly of claim 8 wherein the lift tab further includes a second lift tab flange for stiffening the lift tab.

10. The suspension assembly of claim 9 wherein the second and third regions further define a second supporting member flange, the second supporting member flange and the second lift tab flange defining another notch for separating the second supporting member flange from the second lift tab flange.

11. A head stack assembly for a disk drive having a disk recording surface and a ramp surface, the head stack assembly comprising:
 an actuator arm;
 a suspension assembly attached to the actuator arm;
 the suspension assembly comprising:
  a first elongated region having a distal region and a planar surface for facing toward the disk recording surface, the first elongated region defining a longitudinal axis;
  a second elongated region positioned adjacent to the distal region; the second elongated region including:
   a lift tab for engaging the ramp surface, the lift tab being vertically offset from the planar surface such that the lift tab is vertically displaced further from the disk recording surface than the planar surface;
   a curved lift tab supporting member for supporting the lift tab, the lift tab supporting member positioned between the distal region and the lift tab;
   the lift tab supporting member including:
    a first region being integrally formed with the distal region;
    a second region being integrally formed with the lift tab;

a third region positioned between the first and second regions such that the second region is vertically offset from the first region, the third region defining a first trough for stiffening the supporting member; and the distal region and the first region defining a second trough for stiffening the distal and first regions, the second trough extending along the direction of the longitudinal axis, the second trough having an outer surface for facing toward the disk recording surface, the outer surface being vertically displaced closer toward the disk recording surface than the planar surface.

12. The head stack assembly of claim 11 wherein the first elongated region further includes:

an aperture positioned adjacent to the distal region; and the second trough being contiguous to the first trough and extending to the aperture.

13. The head stack assembly of claim 12 wherein the second trough is semi-cylindrically shaped.

14. The head stack assembly of claim 11 wherein the first elongated region is integrally formed with the second elongated region.

15. The head stack assembly of claim 11 wherein the first trough includes:

a first surface defining a semi-cylindrically shaped surface; and a second surface adjacent to the first surface, the second surface defining a first radius of curvature and a second radius of curvature different than the first radius of curvature, the second surface positioned between the distal region and the first surface.

16. The head stack assembly of claim 15 wherein the first trough further includes a third surface positioned between the first surface and the lift tab, the third surface being in the shape of a saddle.

17. The head stack assembly of claim 15 wherein an axis of the first surface is inclined relative to the planar surface.

18. The head stack assembly of claim 11 further comprising:

a first lift tab flange;

a first supporting member flange;

the first lift tab flange and the first supporting member flange defining a notch such that the flanges are spaced-apart longitudinally.

19. The head stack assembly of claim 18 wherein the lift tab further includes a second lift tab flange for stiffening the lift tab.

20. The head stack assembly of claim 19 wherein the second and third regions further define a second supporting member flange, the second supporting member flange and the second lift tab flange defining another notch for separating the second supporting member flange from the second lift tab flange.

21. A disk drive comprising:

a base;

a spindle motor attached to the base;

a disk mounted on the spindle motor, the disk having a disk recording surface;

a ramp coupled to the base, the ramp having a ramp surface;

a head stack assembly coupled to the base;

the head stack assembly comprising:

an actuator arm;

a suspension assembly attached to the actuator arm;

the suspension assembly comprising:

a first elongated region having a distal region and a planar surface for facing toward the disk recording surface, the first elongated region defining a longitudinal axis;

a second elongated region positioned adjacent to the distal region; the second elongated region including:

a lift tab for engaging the ramp surface, the lift tab being vertically offset from the planar surface such that the lift tab is vertically displaced further from the disk recording surface than the planar surface;

a curved lift tab supporting member for supporting the lift tab, the lift tab supporting member positioned between the distal region and the lift tab;

the lift tab supporting member including:

a first region being integrally formed with the distal region;

a second region being integrally formed with the lift tab;

a third region positioned between the first and second regions such that the second region is vertically offset from the first region, the third region defining a first trough for stiffening the supporting member; and the distal region and the first region defining a second trough for stiffening the distal and first regions, the second trough extending along the direction of the longitudinal axis, the second trough having an outer surface for facing toward the disk recording surface, the outer surface being vertically displaced closer toward the disk recording surface than the planar surface.

22. The disk drive of claim 21 wherein the first elongated region further includes:

an aperture positioned adjacent to the distal region; and the second trough being contiguous to the first trough and extending to the aperture.

23. The disk drive of claim 22 wherein the second trough is semi-cylindrically shaped.

24. The disk drive of claim 21 wherein the first elongated region is integrally formed with the second elongated region.

25. The disk drive of claim 21 wherein the first trough includes:

a first surface defining a semi-cylindrically shaped surface;

a second surface adjacent to the first surface, the second surface defining a first radius of curvature and a second radius of curvature different than the first radius of curvature, the second surface positioned between the distal region and the first surface.

26. The disk drive of claim 25 wherein the first trough further includes a third surface positioned between the first surface and the lift tab, the third surface being in the shape of a saddle.

27. The disk drive of claim 25 wherein an axis of the first surface is inclined relative to the planar surface.

28. The disk drive of claim 21 wherein the suspension assembly further comprises:

a first lift tab flange;

a first supporting member flange;

the first lift tab flange and the first supporting member flange defining a notch such that the flanges are spaced-apart longitudinally.

29. The disk drive of claim 28 wherein the lift tab further includes a second lift tab flange for stiffening the lift tab.

30. The disk drive of claim 29 wherein the second and third regions further define a second supporting member flange, the second supporting member flange and the second lift tab flange defining another notch for separating the second supporting member flange from the second lift tab flange.

\* \* \* \* \*